United States Patent [19]

Wegwerth et al.

[11] 3,922,440

[45] Nov. 25, 1975

[54] SAFETY GLASS LIGHT CONTROL MEDIUM

[75] Inventors: Arthur A. Wegwerth, Maplewood; R. Dean Lowrey, White Bear Lake, both of Minn.

[73] Assignee: Minnesota Mining and Manufacturing Company, St. Paul, Minn.

[22] Filed: Aug. 16, 1974

[21] Appl. No.: 497,930

[52] U.S. Cl. .............. 428/437; 428/412; 428/515; 428/481; 428/483; 428/501; 428/913
[51] Int. Cl.² .............. B32B 17/10; B32B 27/42; B32B 27/30
[58] Field of Search ....... 161/199, 6, 257, 248, 183, 161/231

[56] References Cited
UNITED STATES PATENTS

| | | | |
|---|---|---|---|
| 2,980,567 | 4/1961 | Steel | 161/199 X |
| 3,285,888 | 11/1966 | Brown et al. | 260/80.5 |
| 3,524,789 | 8/1970 | Olsen | 161/6 |
| 3,658,636 | 4/1972 | Beckmann et al. | 161/199 |
| 3,762,981 | 10/1973 | Blank | 161/199 X |

*Primary Examiner*—George F. Lesmes
*Assistant Examiner*—Alan T. McDonald
*Attorney, Agent, or Firm*—Alexander, Sell, Steldt & DeLaHunt

[57] ABSTRACT

A humidity-resistant shatter-resistant light control medium comprises a light collimating film with cellulose acetate or cellulose acetate-butyrate surfaces having bonded to those surfaces a polymeric adhesive obtained from the polymerization of monomers comprising
1. 50-80% by weight total monomer alkyl acrylate having 1 to 8 carbon atoms in the alkyl substituent and/or tetrahydrofurfuryl acrylate;
2. 20-50% of monomers further comprising
   a. 0 to 50% by total weight of monomer N-alkylacrylamide and/or N-alkylmethacrylamide, wherein the alkyl groups thereof have 1 to 8 carbon atoms, and
   b. 0 to 50% by total weight of monomers N-vinyl-2-pyrrolidone, the adhesive layer further bonded to a transparent, protective covering material.

3 Claims, No Drawings

SAFETY GLASS LIGHT CONTROL MEDIUM

Film or sheet materials with parallel louver elements or ordered louver elements are known to be able to provide directional control over penetrating visible radiation. Light is allowed to pass through such films or sheets only within a controlled angle of incidence. Such films and methods of manufacturing them are shown in U.S. Pat. No. 3,524,789 and U.S. application Ser. No. 284,403, filed Aug. 28, 1972, now abandoned. These light control films are generally comprised of a transparent synthetic resin binder and arranged louver-like elements which are distributed within the binder in an organized light screening or light collimating fashion (parallel to each other and normal to the surface or parallel to each other and at a defined angle to the surface of the sheet).

Two limitations exist in the use of the films, mainly because they are thin sheet materials: (1) they are by themselves not capable of structurally withstanding extreme stresses and surface abrasions, and (2) they are subject to distortion from physical stress and temperatures. As it would be very difficult and expensive to make a light control film of sufficient thickness to be structurally sound and because this would still not improve the tendency of the surface to abrade, it is necessary to reinforce the sheets in another manner.

Reinforcement of light collimating film materials presents a number of problems peculiar to the product and to the materials used in the product. Whatever the means of reinforcement, the problems of structural weaknesses and surface abrasion must be overcome without adversely affecting the optical properties of the film. A structurally sound light control film serves no purpose if it is highly distorted, poorly light transmissive, and undergoes permanent color changes under the influence of light. It is also necessary that any structurally reinforced light control film be able to withstand tests established as industrial standards for particular types of uses of such light control film. For example, the automobile safety glass industry has developed standard tests which are described in Federal Motor Vehicle Safety Standard 205 of the National Motor Vehicle Safety Act of 1966. These tests include minimum requirements applicable to safety glass for withstanding humidity and temperature extremes.

It is therefore one aspect of this invention to provide a structurally sound, undistorted light control panel. It is another aspect of this invention to reinforce light control film by laminating such film between two other sheet materials by means of adhesive.

Further aspects of the present invention will be understood from the following discussion.

Light control films can be made of many different synthetic resinuous materials. The most preferred materials, and the only materials with which the present invention is concerned are cellulose acetate and cellulose acetate-butyrate (i.e., polymeric films the polymer of which is at least 80% by weight of these materials). These materials are preferred by the industry because of their utility in known processes of manufacturing light control film as well as their desirable optic properties. The desirability of these two materials as light control films adds but another problem to the reinforcement of the films in that such materials do not generally adhere well to materials useful as adhesives. Furthermore, these films have a relatively low melting temperature (~235°C) and will therefore also tend to distort more rapidly than other film materials under many processing conditions. This further restricts the materials which may be used as adhesives for securing the light control film to a structurally supporting surface.

Only one particular class of adhesive has been found to provide all the necessary properties for bonding cellulose acetate and cellulose acetate-butyrate films to supporting surfaces such as butyral coated glass or resin surfaces. The broadest class of resins useful in the practice of this invention are thermoplastic polymers derived from monomers comprising 50–80% by weight:
 1. alkyl acrylate having 1 to 8 carbon atoms in the alkyl substituent thereof; and/or
 2. tetrahydrofurfuryl acrylate.
20 to 50 by weight monomers further comprising:
 1. 0 to 50% N-alkylacrylamide and/or N-alkylmethacrylamide, wherein the alkyl groups thereof have 1 to 8 carbon atoms, and
 2. 0 to 50% by weight N-vinyl-2-pyrrolidone.

Most of these resins are disclosed in U.S. Pat. No. 3,285,888, issued Nov. 15, 1966 and are polymers of:
 a. 40–75 parts by weight of at least one member selected from (1) tetrahydrofurfuryl acrylate and (2) alkyl acrylates having 1–8 carbon atoms in the alkyl substituent;
 b. 15–45 parts by weight of at least one member selected from N-alkyl-acrylamide and N-alkyl-methacrylamide wherein the alkyl groups thereof have 1–8 carbon atoms; and
 c. 10–30 parts by weight N-vinyl-2-pyrrolidone. Where the monomer (a) consists essentially of tetrahydrofurfuryl acrylate, the proportion of N-vinyl-2-pyrrolidone may vary from 0 to 30 parts per weight.

The addition of other copolymerizable monomers to the polymer system tends to detract from the performance of the resin, but about 10% by weight of copolymerizable, optically clear materials (e.g., acrylic acid, styrene and other ethylenically unsaturated monomers) may be used without extreme deterioration in the properties of the adhesive. Where the cellulose acetate or cellulose acetate butyrate light control films are to be bonded between transparent thermoplastic sheets (e.g., polycarbonates, acrylic resins, methacrylic resins, polyesters, etc.), a single film of the above adhesive, applied with minimum solvent, as by the use of a preformed thermoplastic adhesive film, is completely satisfactory in bonding the light control film to the sheets.

Where the cellulose acetate or cellulose acetate-butyrate film is sandwiched between glass sheets, it is necessary to use a polyvinyl butyral resin (comprising at least 80% of polyvinyl butyral by weight solids and at most 30% by weight plasticizer) between the adhesive on the light control film and the transparent glass sheet.

U.S. Pat. No. 3,285,888 which discloses adhesive compositions useful in the practice of this invention teaches only the usefulness of those adhesives on surfaces such as highly plasticized polyvinyl chloride, steel and canvas. It is surprising that these adhesives have been found to provide the strong adhesion and other critical parameters necessary for bonding cellulosic light control film to other transparent surfaces.

Federal Motor Vehicle Safety Standard 205 of the National Motor Vehicle Safety Act provides a number of tests for tinted laminated safety glass. U.S.A. Standard Z26.1-1966 of this Act provides three tests which evaluate the most significant properties of safety glass, shatter resistance and humidity resistance.

Tests 3 and 4 of this U.S.A. Standard measure humidity resistance. In the former test, a standard specimen of a 12 inch × 12 inch square (30.5 cm × 30.5 cm) are kept in a closed container over water for two weeks at 120° to 130°F. Decomposition, formation of bubbles, discoloration and separation are then evaluated.

Test 4 requires that a standard specimen be subjected to water at 150°F. for three minutes and then followed immediately by boiling water for two hours. The tested laminate is then inspected for any form of defect resulting from the treatment.

Test 12 of that standard provides a measurement of impact resistance and shatter resistance by dropping a ½ pound (255 g.) smooth solid steel sphere from thirty feet onto a framed and secured laminate. Only minimum glass separation from the resin is allowed in the specifications of this test.

In addition to the satisfaction of these functional test requirements, it is essential that the addition of the adhesive layers to the cover sheets and light control film not reduce the total visible light transmissivity by more than 20%. Such a reduction of light transmission would essentially render the composite undesirable as a window.

To examine a class of adhesive or specific adhesive, the tests were initially performed on an article comprising two sheets of cellulose acetate butyrate and the adhesive. If this article could undergo the test procedures with satisfactory results, an article comprising the glass sheets sandwiching the light control film was constructed and examined. All adhesives were applied according to instructions provided for commercially available adhesives or generally recognized techniques for specially formulated compositions.

The following adhesives failed to provide even initial securement between the films; that is, they provided almost no measurable bond (less than 1 lb/inch width) between the sheets:

polyvinyl butyral resin
ethylene-acrylic acid copolymers
block copolymers of styrene and butadiene Other materials were used with unsatisfactory results. Rhoplex AC34 (a copolymer of polybutyl acrylate and methyl methacrylate) failed to provide a bond to the surface of the cellulose acetate-butyrate film after 7 days at 70% relative humidity and 95°F.

GT Butvar (a polyacrylate blended with polyvinyl butyral) generated bubbles within the adhesive during the boiling water test. The bubbles diminished the optical properties of the film. When the adhesive was used to laminate the light control film to glass with polyvinyl butyral, the glass was found to separate too readily from the film when shattered, thus not providing important safety glass characteristics.

Poly(2-ethylhexyl acrylate) failed the humidity test after fourteen days, developed bubbles during testing and generally provided too weak a bond to the cellulose acetate butyrate surface.

Commercially available polyethylene terephthalate adhesive separated cleanly from the film and failed to maintain any bond in boiling water.

A copolymer of ethyl acrylate and acrylic acid did not provide sufficient initial bonding strength and also failed to provide any bond in boiling water.

The general epoxy resin adhesives form good initial bonds but lose all bond strength at high humidity and in the boiling water test. Another class of adhesives, the cyanoacrylates, give strong initial bonds but fail in the boiling water test. Polyurethane adhesives generally failed during humidity and boiling tests and/or developed coloration which significantly reduced the transparency of the laminate (e.g., 30% reduction in transmissiveness).

Laminates of the present invention can be constructed as follows: The adhesive is spread on a silicon treated release paper at 4 to 5 mils wet with a 20% by weight solids solution. The solvent is evaporated in a drying oven at 130°F. and then 250°F. A chipboard is placed in a metal platen and the adhesive is placed in a metal platen and the adhesive is placed thereon with the release paper next to the board. A cellulose acetate butyrate light control film is placed over the adhesive layer, and a second adhesive layer-release paper composite is placed over the film with the adhesive in contact with the light control film. A second chipboard and metal place sandwich in the unbonded structure which is then pressed at 100 psi and 280°F. for a few seconds, then cooled, and the release paper stripped from the laminate. The adhesive coated light control film is thus prepared for direct bonding to a clear resin surface.

Bonding to a clear resin surfacing film can be accomplished by placing the adhesive coated light control film between preformed thermoplastic sheets or partially curing thermoset resin sheets and the unbonded sandwich of materials placed within a heated platen and pressed. With light control films having the louvers directed perpendicularly to the surface, temperatues of about 280°F may be used to bond the sandwich. With light control films having louvers not perpendicularly aligned with the surface, temperatures not exceeding 240°F should be used to avoid random procession of the louvers towards the perpendicular.

EXAMPLE I

A safety glass-light control film laminate was made as follows.

Two adhesive films of polymers prepared according to the method shown in Example 2 of U.S. Pat. No. 3,285,888, having an original monomer ratio of (55/25/20) ethyl acrylate/t-butyl acrylamide/n-vinyl-2-pyrrolidone, were formed by coating silicone release paper with a 5 mil wet coat of the resin solution and dried at about 250°F.

A sandwich was then formed between these two adhesive sheets (with the release paper maintained on the outside surface of the sandwich) by placing cellulose acetate butyrate films against the interior surfaces of the adhesive films and a skived, louvered cellulose acetate butyrate light control element having 0° (perpendicular) louveres, made according to U.S. patent application Ser. No. 284,403, filed Aug. 28, 1972, between the two cellulose acetate butyrate layers. This five part sandwich (adhesive, cellulose acetate butyrate, louvered element, cellulose acetate butyrate, adhesive) was placed between metal plates with chipboard covers at 100 lbs/in$^2$ at 275°F. for a few minutes and removed.

Two glass sheets having one surface of each coated with polyvinyl butyral resin were placed in a platen with the uncoated surfaces against the plate surfaces with the five layer sandwich between the glass sheets. The unbonded composite was heated at 190°–200°F. at 10–15 lbs/in$^2$ for only sufficient time as was necessary to secure the layers; then the composite is cooled to room temperature. The final bond was secured in an autoclave with 125 lbs/in² pressure at 275°–280°F. for 1½ hours and then cooled in the pressurized autoclave.

The product was subjected to the humidity and boiling water tests with no adverse results. The laminate also performed according to required standards in the shatter test. There was sufficient transmission through the safety-glass laminate product to enable its use as a window material.

EXAMPLES II – V

According to the above method of laminating safety glass products, four different adhesives within the defined adhesive class of this invention were used. The adhesives used were:

1. Ethyl acrylate/t-butyl acrylamide/n-vinyl-2-pyrrolidone (55/25/20) terpolymer.
2. The above terpolymer modified with the addition of less than 10% by weight total of a butadiene-acrylonitrile copolymer, malic acid, and natural esters of abietic acid.
3. A copolymer of ethyl acrylate/t-butyl acrylamide (65/35).
4. A copolymer of ethyl acrylate/n-vinyl-2-pyrrolidone (65/35).

All four composites were subjected to the humidity, boiling water and shatter tests, and all four composites passed. The adhesives were also colorless and reduced transmissiveness by less than 10%. All exhibited acceptable peel strength (i.e., greater than 8 lbs. per inch width) and the first three adhesives exhibited peel strengths exceeding 15 lbs./in. width.

The above examples show that only the presently cited class of adhesives have been able to perform satisfactorily in the light control safety glass structures presently described.

A light collimating laminate comprising a light collimating, transparent, cellulose acetate or cellulose acetate butyrate film having bonded on the opposed major surfaces a transparent adhesive derived from the polymerization of 1. 50–80% by weight alkyl acrylates having 1 to 8 carbon atoms in the alkyl substituent and/or tetrahydrofurfuryl acrylate,
2. 20 to 50% by weight of monomers further comprising 0 to 50% N-alkylacrylamide and/or N-alkylmethacrylamide with the alkyl groups thereof having 1 to 8 carbon atoms, and 0 to 50% by weight N-vinyl-2-pyrrolidone, and secured to the adhesive a transparent synthetic resin or the butyral surface of glass bonded to an at least 70% by weight polyvinyl butyral resin coating.

What we claim is:

1. A humidity-resistant shatter-resistant light control medium comprising a light collimating film with cellulose acetate or cellulose acetate-butyrate surfaces having bonded to those surfaces a polymeric adhesive obtained from the polymerization of monomers comprising
   1. 50–80% by weight total monomer alkyl acrylate having 1 to 8 carbon atoms in the alkyl substituent and/or tetrahydrofurfuryl acrylate;
   2. 20–50% of monomers further comprising
      a. 0 to 50% by total weight of monomer N-alkylacrylamide and/or N-alkylmethacrylamide, wherein the alkyl groups thereof have 1 to 8 carbon atoms, and
      b. 0 to 50% by total weight of monomers N-vinyl-2-pyrrolidone, the adhesive layer further bonded to a transparent, protective covering material.

2. The light control medium of claim 1 wherein the protective covering material is glass having an improved bonding surface of butyral resin against the said polymeric adhesive layer.

3. The light control medium of claim 1 wherein the protective covering material is a transparent polymeric layer.

* * * * *